(12) United States Patent
Heinen et al.

(10) Patent No.: US 6,567,949 B2
(45) Date of Patent: May 20, 2003

(54) METHOD AND CONFIGURATION FOR ERROR MASKING

(75) Inventors: Stefan Heinen, Düren (DE); Wen Xu, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 09/725,347

(22) Filed: Nov. 29, 2000

(65) Prior Publication Data

US 2002/0007473 A1 Jan. 17, 2002

Related U.S. Application Data

(63) Continuation of application No. PCT/EP99/03765, filed on May 31, 1999.

(51) Int. Cl.[7] .................. H03M 13/00; G06F 11/00; G10L 19/00
(52) U.S. Cl. .................. 714/752; 714/701; 704/230
(58) Field of Search .................. 714/3, 752, 755, 714/758, FOR 102, 701; 704/230

(56) References Cited

U.S. PATENT DOCUMENTS 5,247,579 A * 9/1993 Hardwick et al. .......... 704/230
5,557,639 A * 9/1996 Heikkila et al. ............ 375/224
6,161,089 A * 12/2000 Hardwick ................... 704/219

OTHER PUBLICATIONS

A probabilistic Framework for Optimum Speech Extrapolation in Digital Mobile Radio: Gerlach, C.G., Acoustics, Speech, and Signal Processing, 1993. ICASSP–93., 1993 IEEE International, pp.: 419–422, vol. 2.*

Error Protection for Low Rate Speech transmission over a Mobile Satellite Channel: Tzeng, F.F & Sherwood, P.G., Global Telecommunications Conference, 1990, and Exhibition, GLOBECOM '90., IEEE , 1990, pp.: 1810–1814, vol. 3.*

"Channel Codes that Exploit the Residual Redundancy in CELP–Encoded Speech" (Alajaji et al.), dated Sep. 1996.

"An Adaptive Multi–Rate Speech Codec Based on MP–CELP Coding Algorithm for ETSI AMR Standard" (Ito et al.), dated 1998.

"Error Concealment by Softbit Speech Decoding" (Fingscheidt et al.),dated Sep. 1996.

"A 6.1 to 13.3–KB/S Variable Rate CELP CODEC (VR–CELP) for AMR Speech Coding" (Heinen et al.), dated 1999, XP–002115822, pp. 9–12.

* cited by examiner

Primary Examiner—Albert Decady
Assistant Examiner—Matthew C. Dooley
(74) Attorney, Agent, or Firm—Laurence A. Greenberg; Werner H. Stemer; Ralph E. Locher

(57) ABSTRACT

For the purpose of error masking, binary representation of parameter values are precoded at the transmitting end by a linear block code before transmission over a faulty channel, and the redundant information added in this way is not used at the receiving end for error detection within the binary parameter representations, but is utilized in the course of a parameter estimation to improve the quality of the estimated parameter values.

7 Claims, 3 Drawing Sheets

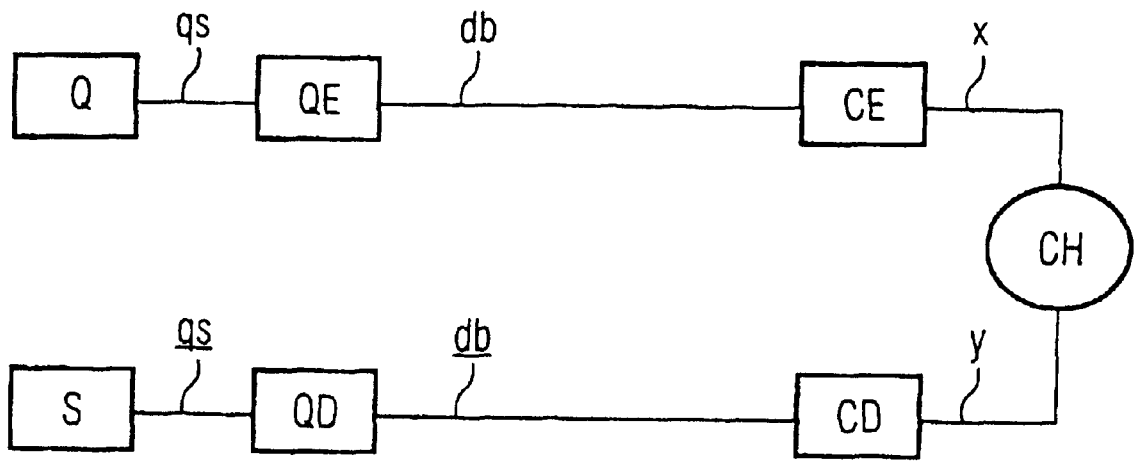
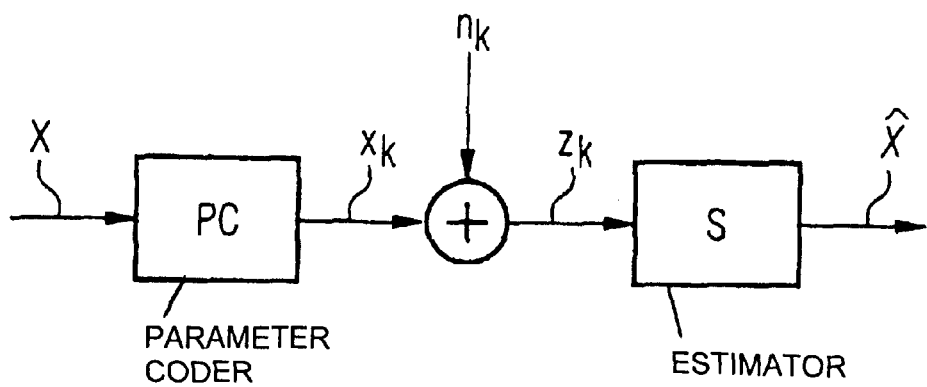

METHOD AND CONFIGURATION FOR ERROR MASKING

CROSS-REFERENCE TO RELATED APPLICATION

This is a continuation of copending International Application PCT/EP99/03765, filed May 31, 1999, which designated the United States.

BACKGROUND OF THE INVENTION

Field of the Invention

The invention relates to a method and to configurations for error masking in the transmission and/or storage of digital data, in particular in the case of application of source coding (for example speech coding using the Code Excited Linear Predictive-CELP principle). Within the scope of the invention, transmission (sending and/or receiving) is also understood as the transfer of data to/from a storage medium, that is to say also the storage of data.

Source signals or source information such as speech, sound, image and video signals virtually always include statistical redundance, that is to say redundant information. This redundancy can be greatly reduced by source coding, thus permitting efficient transmission and/or storage of the source signal. This reduction in redundancy removes, before transmission, redundant signal contents which are based on the prior knowledge of, for example, statistics of the signal shape. The bit rate of the source-coded information is also called coding rate or source bit rate. After the transmission, these components are added to the signal again during the source decoding so that no loss of quality can be detected objectively and/or subjectively.

On the other hand, it is customary in signal transmission specifically to make use of channel coding to add redundancy again, in order largely to eliminate the influence of channel faults on transmission. Additional redundant bits permit the receiver and/or decoder to detect errors and possibly also to correct them. The bit rate of the channel-coded information is also called gross bit rate.

In order to be able to transmit as efficiently as possible information, in particular speech data, image data or other useful data, by means of the limited transmission capacities of a transmission medium, in particular of an air interface, this information which is to be transmitted is therefore compressed before transmission by a source coding and protected against channel errors by a channel coding. Different methods are respectively known for these purposes. Thus, for example, in the GSM (Global System for Mobile Communication) speech can be coded by means of a full rate speech codec, a half rate speech codec or an enhanced full rate speech codec.

Within the scope of this application, a method for encoding and/or for corresponding decoding, which can also comprise a source and/or channel coding, is also denoted as a speech codec.

Residual bit errors which cannot be corrected by the channel decoding, occasionally lead to a substantial impairment of the speech reproduction. An additional method for error masking is capable of substantially improving the subjectively perceived reproduction quality.

By way of example, in the case of a frame extinction in the GSM, the last correctly received speech frame is repeated instead of the instantaneous one. After five successive faulty frames muting is performed in stages. This method is controlled by binary frame reliability information, the Bad Frame Indicator (BFI).

Soft bit speech decoding can be used for error masking by systematic expansion of the reliability information passed on to the speech decoder by the channel decoder. Methods are known in this case (Tim Fingscheidt, Peter Vary, "Error Concealment by Softbit Speech Decoding", ITG Fachbericht No. 139 "Sprachkommunikation" ["Speech communication"], pages 7–10, Frankfurt a.M., 1996), in which methods of decision and estimation theory are used and are briefly explained below.

The signal-to-noise power ratio (SNR) between transmitted and received parameter values proves to be an informative quality criterion for the majority of the speech parameters determined, for example, by an CELP speech codec. Subjectively perceived speech quality and parameter SNR are thereby well correlated as a rule.

For this reason, a parameter decoder (for example a speech coder based on CELP) is sensible; it maximizes this SNR between a transmitted parameter (which is not, however, limited to speech parameters) X and the appropriately decoded parameter $\hat{X}$ on average, or minimizes their quadratic difference, that is to say $$\hat{X} = \arg \min_{\tilde{x}} E\{(X - \tilde{X})^2\} \tag{1.1}$$

In order to transmit the continuous-value parameter X, it is first necessary to undertake coding by means of the bit sequence $\{x_1, \ldots x_W\}$. This is performed by quantization, as a rule. For this purpose, the entire value range of the parameter X is decomposed into $2^W$ intervals (or cells in the case of vector quantization) $S_i$. Each of these cells is respectively assigned a unique transmit bit sequence $x_i = \{x_1(i), \ldots x_W(i)\}$.

A channel with a binary input x and continuous-value output z is now adopted as a transmission channel. In this case, the values z observed at the output are a function of the input values x and a random process which is not initially specified in more detail. All that is presupposed for interference which acts on successive bit sequences and/or parameters is statistical independence. This channel can be completely described by the likelihood function $p_{z|x}(z_1, \ldots z_W | X_1, \ldots X_W)$.

The expectation in (1.1) is therefore determined by two random processes: by the parameter-generating process X and the observed received values z, that is to say $$E_{X, \{z1, \ldots, zW\}}\{[X - \tilde{X}(z_1, \ldots, z_W)]^2\} = \tag{1.2}$$

$$\int_{z_1, \ldots, z_W} \int_X [X - \tilde{X}(z_1, \ldots, z_W)]^2$$

$$p_{x, z_1, \ldots, z_W}(X, z_1, \ldots, z_W) dX dz_1 \ldots dz_W.$$

Since the integrand is always positive, the expectation can be minimized by minimizing the inner integral with respect to $\tilde{X}$ for each possible reception sequence $\{z_1, \ldots, z_W\}$. The result is the formula of the Mean Square (MS) estimator $$\tilde{X}_{opt} = \int_X X \cdot p_{x|z_1, \ldots, z_W}(X | z_1, \ldots, z_W) dX \tag{1.3}$$

Taking account of the quantization at the transmitting end, this further yields $$\tilde{X}_{opt} = \sum_i \int_{X \in S_i} X \cdot \frac{p_{z_1,\ldots,z_W|x}(z_1,\ldots,z_W|x) \cdot p_x(X)}{p_{z_1,\ldots,z_W}(z_1,\ldots,z_W)} dX. \quad (1.4)$$

Since the same bit sequence $x_i$ is transmitted for all $X \in Si$, the conditional probability in the numerator is a constant with respect to the integration, and it follows that $$\tilde{X}_{opt} = \sum_i \frac{p_{z_1,\ldots,z_W|x}(z_1,\ldots,z_W|x_i)}{p_{z_1,\ldots,z_W}(z_1,\ldots,z_W)} \int_{X \in S_i} X \cdot p_x(X) dX \quad (1.5)$$

$$= \sum_i \frac{p_{z_1,\ldots,z_W|x}(z_1,\ldots,z_W|x_i)}{p_{z_1,\ldots,z_W}(z_1,\ldots,z_W)} \cdot E(X|x_i) \cdot Pr(x_i)$$

$$= \sum_i E(X|x_i) \cdot Pr(x_i|z_1,\ldots,z_W)$$

If the parameter-generating process X is not devoid of memory, there are additional statistical connections between successive parameter values and/or bit sequences x.

An analogous derivation then follows taking account of the time index n $$\tilde{X}_{opt}(n) = \quad (1.6)$$

$$\sum_i E(X|x_i) \cdot Pr(x_i|z_1(n),\ldots,z_W(n),\ldots,z_1(0),\ldots,z_W(0)).$$

It is shown below how the a posteriori probabilities can be determined in (1.5) and (1.6):

It may be assumed by way of simplification that the transmission channel located between a source coder and a source decoder and comprising a channel coder, modulator, physical channel, demodulator, equalizer and channel decoder can be considered, as shown in FIG. 3, as a faulty channel, devoid of memory at the bit level, with a binary input x and continuous output z. In this case, the source coder is illustrated in a simplified fashion by a parameter coder PC, and the source decoder is illustrated in a simplified fashion by an estimator S. This channel is completely described by the likelihood function $p_{z|y}(z_k|y_k)$ and/or by the L values $L(z_k|x_k)$. Initially, the a posteriori probability is to be specified for white parameter sources in accordance with (1.5). The Bayes formula is applied for this purpose:

$$Pr(x_i|z_1,\ldots,z_W) = \frac{p_{z_1,\ldots,z_W|x}(z_1,\ldots,z_W|x_i)}{\sum_j p_{z_1,\ldots,z_W|x}(z_1,\ldots,z_W|x_j) \cdot Pr(x_j)} \cdot Pr(x_i) \quad (1.7)$$

All the variables are now known in this: the likelihood function $p_{z_1,\ldots,z_W|x}(z_1,\ldots,z_W|x_i)$ is given by the channel characteristics, and $Pr(x_i)$ is the a priori probability that the bit sequence $x_i$ is being transmitted. These probabilities are measured in advance for all i with the aid of representative signal data (for example speech samples in the case of speech coding).

The likelihood function can be written as a product since a channel which is devoid of memory at the bit level was presupposed $$P_{z_1,\ldots,z_W|x}(z_1,\ldots,z_W|x_i) = \prod_{k=1}^{W} p_{z|x}(z_k|x_k(i)). \quad (1.8)$$

If the source decoder is provided with reliability information on the parameter X in the form of an L value sequence $\{L(z_1|x_1),\ldots,L(z_W|x_W)\}$, it is possible to calculate (1.8) efficiently in the logarithmic region. The following is yielded $$p_{z_1,\ldots,z_W|x}(z_1,\ldots,z_W|x_i) = C \cdot \exp\left(\sum_{\{k|x_k(i)=+1\}} L(z_k|x_k)\right). \quad (1.9)$$

In this case, C is a constant which can be determined by the normalizing condition $$\sum_i Pr(x_i|z_1,\ldots,z_W) = 1 \quad (1.10)$$

If the parameter source X is not white, that is to say there is a statistical dependence between successive output values, the source can be modeled by a Markov chain. Only the case of a first order Markov chain is to be considered here. It holds in this case with $z_n = \{z_1(n),\ldots,z_w(n)\}$ $$Pr(x_i(n)|z_n, z_{n-1},\ldots,z_0) = \frac{p(z_n,\ldots,z_0|x_i(n))}{p(z_n,\ldots,z_0)} = P(z_n|x_i(n)) \cdot \quad (1.11)$$

$$\frac{\sum_j p(x_i(n), x_j(n-1), z_{n-1},\ldots,z_0)}{p(z_n,\ldots,z_0)} \cdot \underbrace{\frac{p(z_{n-1},\ldots,z_0)}{p(z_n,\ldots,z_0)}}_{const.}.$$

$$p(z_n|x_i(n)) \cdot$$

$$\sum_j Pr(x_i(n)|x_j(n-1)) \cdot Pr(x_i(n-1)|z_{n-1},\ldots,z_0)$$

The indices of the distribution density functions have been dispensed with in the derivation for reasons of clarity. The fraction in (1.11) is a constant with respect to $x_i(n)$, and can be determined with the aid of the normalizing condition (1.10). The transitional probabilities ($Pr(x_i(n)|x_j(n-1))$ of the Markov chain must be measured just like the a priori probabilities on a long output sequence of the parameter source.

An expansion of this recursion formula to a Markov chain of higher order is certainly directly possible, but the increase thereby caused in computational complexity and required storage space is not, as a rule, acceptably related to the increase in accuracy of estimation.

SUMMARY OF THE INVENTION

It is accordingly an object of the invention to provide a method and a configuration for error masking which permit a high-quality reconstruction of source signals from signal data transmitted over a transmission channel affected by error, and which overcomes the above-mentioned disadvantageous of the prior art methods and configurations of this general type.

With the foregoing and other objects in view there is provided, in accordance with the invention a method for error masking that can be used when transmitting parameter values. The method includes steps of: converting parameter values into a binary representation; at a transmitting end, adding first redundant information to at least some of the parameter values by precoding the binary representation of the at least some of the parameter values with a linear block code, and performing the preceding before transmitting the binary representation of the at least some of the parameter values over a faulty channel; and using the first redundant information at a receiving end to estimate the parameter values rather than using the first redundant information for error detection.

The invention is therefore based on the idea that redundancy which is still present in the transmitted signal after the source coding and added explicitly in the form of channel coding is used at the receiving end not for error detection or correction, but is utilized for an estimate which is optimum for the purpose of a measure of quality.

It is therefore possible to carry out the error masking with a higher quality.

In accordance with an added feature of the invention, the method includes steps of: at the transmitting end, performing at least a source coding to obtain the parameter values; adding second redundant information to the precoded binary representation of the at least some of the parameter values; and after the binary representation of the at least some of the parameter values have been transmitted over the faulty channel to a receiving end, using the second redundant information, at the receiving end, for a process selected from the group consisting of error detection and error correction.

In accordance with an additional feature of the invention, the second redundant information is added for channel coding.

In accordance with another feature of the invention, the first redundant information is used at the receiving end as a posteriori information to estimate the parameter values.

In accordance with a further feature of the invention, a soft bit speech decoding method is used to estimate the parameter values.

With the foregoing and other objects in view there is also provided, in accordance with the invention a transmitting device for transmitting parameter values. The transmitting device includes a processor unit configured for: converting parameter values into a binary representation; adding first redundant information to at least some of the parameter values by preceding the binary representation of the at least some of the parameter values with a linear block code, and performing the preceding before transmitting the binary representation of the at least some of the parameter values over a faulty channel; and adding the first redundant information to the at least some of the parameter values in a manner such that at a receiving end, the first redundant information can be used for estimating the parameter values rather than for error detection.

With the foregoing and other objects in view there is provided, in accordance with the invention a receiving device for receiving parameter values which have been converted into a binary representation at a transmitting end before being transmitted over a faulty channel. First redundant information has been added to the binary representation of the parameter values by preceding with a linear block code before the binary representation of the parameter values have been transmitted over the faulty channel. The receiving device includes a processor unit configured for using the first redundant information to estimate the parameter values rather than for using the first redundant information for error detection.

Other features which are considered as characteristic for the invention are set forth in the appended claims.

Although the invention is illustrated and described herein as embodied in a method and configuration for error masking, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a schematic of essential elements of a telecommunication transmission chain;

FIG. 3 shows a schematic of the transmission of a speech parameter; and

DESCRIPTION OF THE PREFERRED EMBODIMENTS

Figure 2:
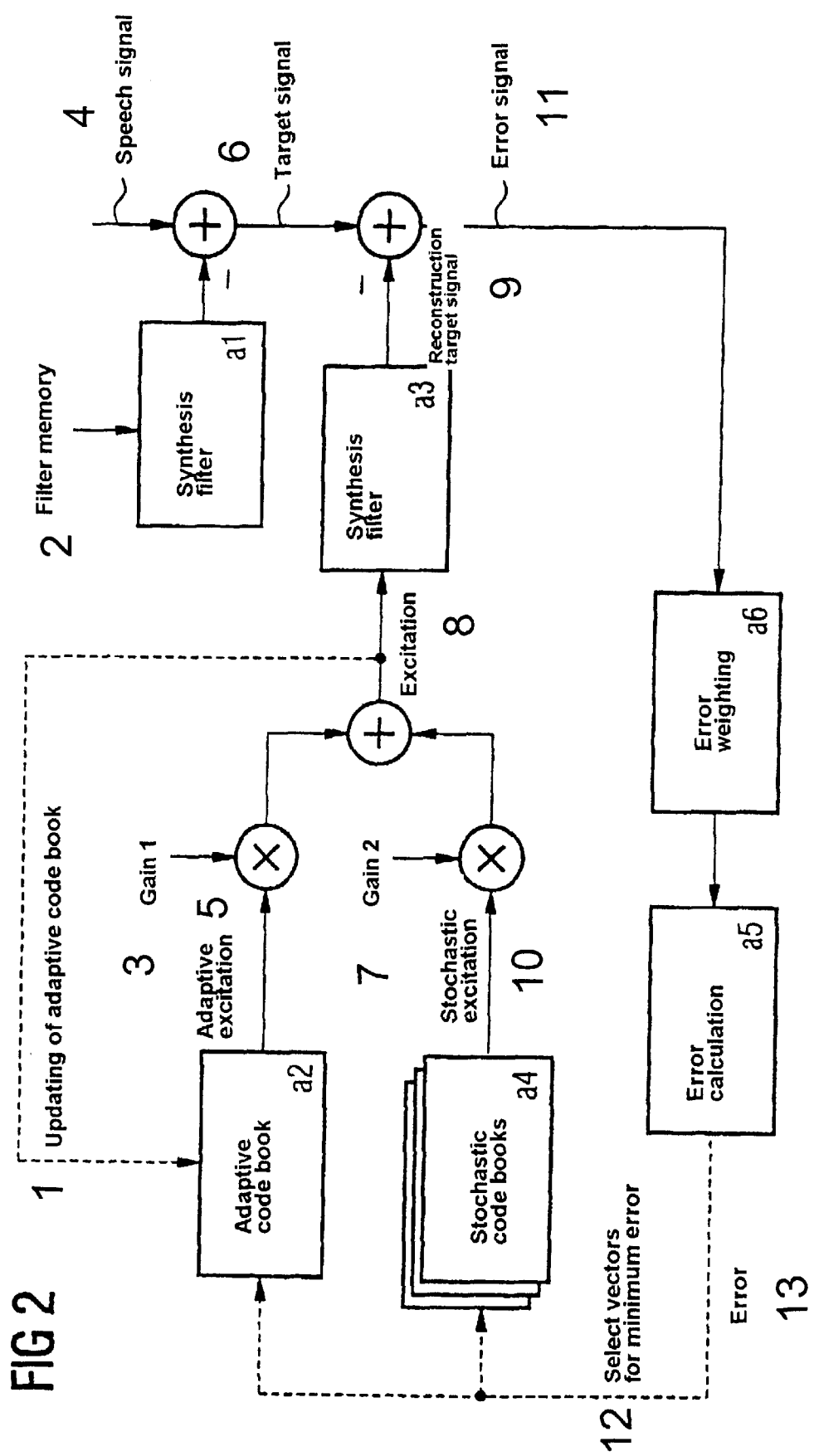
FIG. 2 shows a schematic of an AMR coder based on the CELP principle.

Referring now to the figures of the drawing in detail and first, particularly, to FIG. 1 thereof, there is shown a source Q which generates source signals qs which are compressed by a source coder QE, such as the GSM full rate speech coder, to form symbol sequences consisting of symbols. In the case of parametric source coding methods, the source signals qs (for example speech) generated by the source Q are subdivided into blocks (for example time frames) and processed. The source coder QE generates quantized parameters (for example speech parameters) which are also designated below as symbols of a symbol sequence, and which reflect the characteristics of the source in the current block in a certain way (for example the spectrum of the speech in the form of filter coefficients, amplitude factors, excitation vectors). These symbols have a specific symbol value after quantization.

The symbols of the symbol sequence and/or the corresponding symbol values are mapped onto a sequence of binary code words, which respectively have a plurality of bit positions, by a binary mapping (allocation rule) which is frequently described as part of the source coding QE. If these binary code words are further processed, for example one after another as a sequence of binary code words, the result is a sequence of source-coded bit positions which can be embedded in a framework structure. Source coding carried out in such a way therefore provides in a fashion structured in a frame source bits or data bits db with a source bit rate (coding rate) depending on the type of source coding.

FIG. 2 shows an illustration of the principle of a specific variant of a source coder, in particular a speech coder, specifically a speech coder based on a CELP (Code Excited Linear Predictive) principle.

The CELP principle is an analysis-by-synthesis method. In this case, a filter structure obtained from the current speech section is excited by excitation vectors (code vectors) taken sequentially from a code book. The output signal of the filter is compared with the current speech section by means of a suitable error criterion, and the error-minimizing excitation vector is selected. A representation of the filter structure, and the place number of the selected excitation vector are transmitted to the receiver.

A specific variant of a CELP method uses an algebraic code book which is also frequently denoted as sparse algebraic code. It is a multipulse code book which is filled with binary (+/−1) or ternary (0, +/−1) pulses. Only a few positions are respectively occupied by pulses inside the excitation vectors. After selection of the positions, the entire vector is weighted with an amplitude factor. Such a code book has a plurality of advantages. Firstly, it does not occupy any storage space, since the permitted positions of the pulses are determined by an algebraic computing rule, while secondly because of its design it can be searched very efficiently for the best pulse positions.

A variant design of a conventional CELP coder is first described below with the aid of FIG. 2. A target signal to be approximated is simulated by searching two code books. In this case, a distinction is made between an adaptive code book (a2), whose task is to simulate the harmonic speech components, and a stochastic code book (a4) which serves to synthesize the speech components which cannot be obtained by prediction. The adaptive code book (a2) varies as a function of the speech signal, whereas the stochastic code book (a4) is time-invariant. The search for the best excitation code vectors runs in such a way that no common, that is to say simultaneous search is made in the code books, as would be required for an optimum selection of the excitation code vectors, but the adaptive code book (a2) is first searched through, for reasons of cost. If the best excitation code vector in accordance with the error criterion is found, its contribution to the reconstructed target signal is subtracted from the target vector (target signal), and the part of the target signal still to be reconstructed is obtained from a vector from the stochastic code book (a4). The search in the individual code books is performed using the same principle. In both cases, the quotient of the square of the correlation of the filtered excitation code vector with the target vector and the energy of the filtered target vector is calculated for all excitation code vectors. That excitation code vector which maximizes this quotient is regarded as the best excitation code vector which minimizes the error criterion (a5). The upstream error weighting (a6) weights the error in accordance with the characteristics of human hearing. The position of the excitation code vector found in the excitation code book is transmitted to the decoder.

The correct (code book) amplitude factor (gain 1, gain 2) is determined implicitly for each excitation code vector by calculating the above-described quotient. After the best candidate has been determined from the two code books, the quality-reducing influence of the code book search carried out sequentially can be reduced by a common optimization of the gain. In this case, the original target vector is specified anew, and the best gains are calculated in a fitting fashion relative to the now selected excitation code vectors, said gains mostly differing slightly from those which were determined during the code book search.

In the case of the CELP principle, each candidate vector can be filtered (a3) individually and compared with the target signal in order to find the best excitation code vector.

Finally, filter parameters, amplitude factors and excitation code vectors are converted into binary signals and transmitted in frames in a fashion embedded in a fixed structure. The filter parameters can be LPC (Linear Predictive Coding) coefficients, LTP (Long Term Prediction) indices or LTP (Long Term Prediction) amplitude factors.

The efficiency of a known method described above for error masking can be considerably enhanced by precoding the speech parameter bits with a linear block code at the transmitting end in the way according to the invention. By contrast with conventional channel coding methods, the added redundancy is used not for error detection or error correction at the receiving end, but for a more accurate determination of the a posteriori probabilities required for the estimation.

This principle may be illustrated using a simple Single Parity Check (SPC) code. This systematic linear code adds an additional parity bit $x_p(i)$ to the speech parameter bits. This is determined by the equation $$x_p(i) = \sum_{j=1}^{W} \bigoplus x_j(i) \quad (1.13)$$

The parity bit $x_p(i)$ is transmitted in common with the remaining parameter bits. Consequently, the additional soft information of the received parity bit $z_p$ is available at the receiving end for the parameter estimator. Equation 1.8 can therefore be expanded to $$p_{z_1,\ldots,z_W,z_p|x,x_p}(z_1, \ldots, z_W, z_p | x_j, x_p(i)) = \quad (1.14)$$

$$p_{z|x}(z_p | x_p(i)) \cdot \prod_{k=1}^{W} p_{z|x}(z_k | x_k(i)).$$

The effect caused by the additional factor $p_{z|x}(z_p|x_p(i))$ can be understood descriptively as follows: the a posteriori probabilities of those bit patterns $x_i$ whose parity bit $x_p(i)$ correspond to the actually received value $z_p$ are raised, while all others are lowered. This may be illustrated using a simple example. The quantization of a parameter with a four-stage uniform quantizer is considered. The quantization stages and the associated bit codes are as follows:

0.75: +1,−1
0.25: +1,+1
−0.25: −1,+1
−0.75: −1,−1

At the receiving end, the entry 0.25 is selected in this example, that is to say the bit sequence {+1,+1} is transmitted. Because of channel disturbances, a faulty sequence of soft values is received which can be converted into L values, for example

{9.1,−0.3}.

The following probabilities are yielded herefrom for the table entries, assuming that all entries occur with equal frequency:

0.75: 0.574
0.25: 0.426
−0.25: ~0
−0.75: ~0

This yields the estimated value of
MS=0.537.

If there is now transmitted for the purpose of the invention an additional parity bit whose received L value is assumed to be 5.3, the a posteriori probabilities 0.75: 0.007
0.25: 0.993
−0.25: ~0
−0.75: ~0 and thus the estimated value
MS'=0.2535
are obtained.

This example shows that the estimated value determined at the receiving end is much closer to the value of 0.25 actually transmitted because of the parity bit additionally transmitted. An expansion of this method to more complex linear codes is directly possible.

In a variant design of the invention, the method is used for the LPC index of the first stage at a coding rate of 6.1 kbit/s.

A shortened (13.9) Hamming code is used for this purpose. Simulations show that a clearer gain by comparison with hard decoding can be achieved simply by parameter estimation. The robustness of the transmission can be further raised by linear preceding using a parity bit and the (13.9) Hamming code.

The net data rate is raised after speech coding from 6.1 to 6.3 kbit/s by the 4 parity bits additionally to be transmitted, and this leads to a reduced error protection by the channel coding on account of the gross data rate, which is to be held constant. Informal hearing tests show, however, that in the case of poor channel states (C/I≦4 dB) the reduction in the error robustness is overcompensated because of the reduced channel error protection by the method of linear preceding, that is to say a conspicuous increase in the speech intelligibility can be ascertained on account of the precoding.

Figure 4:
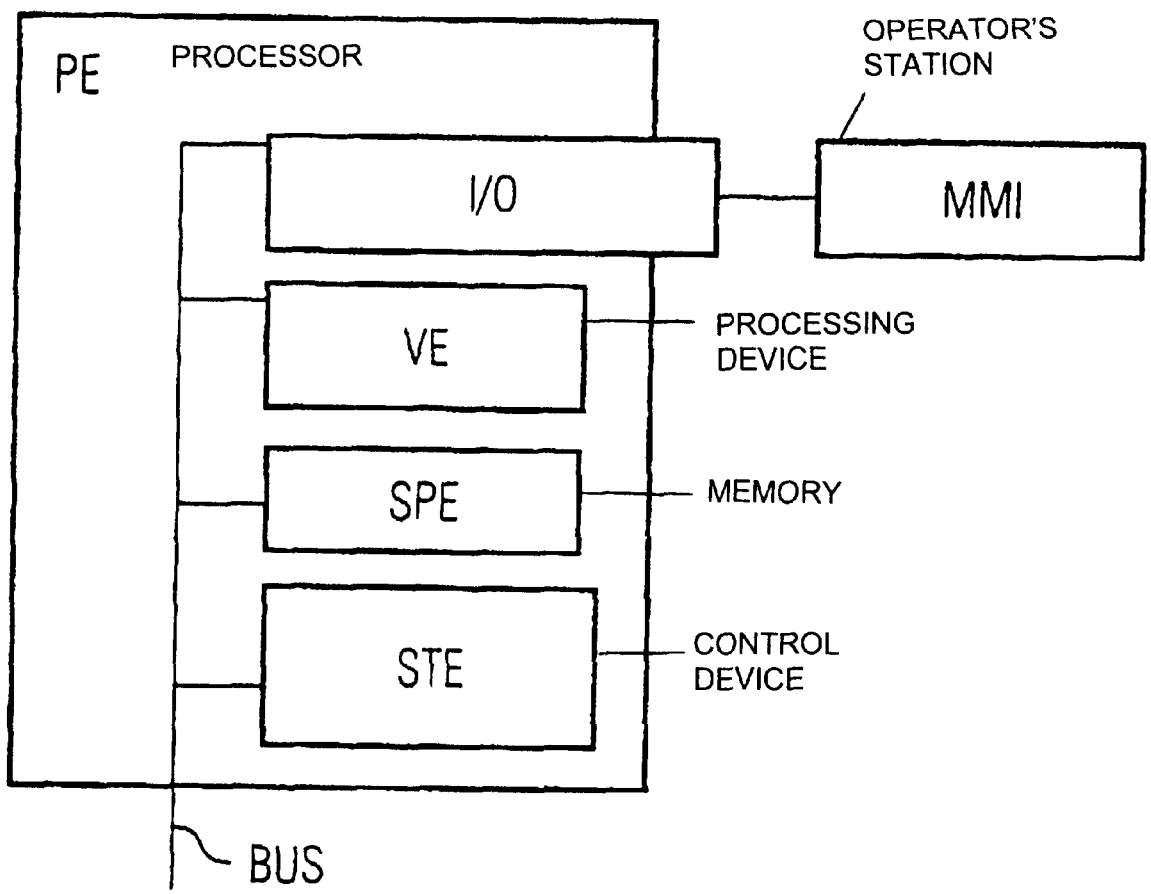
FIG. 4 shows a block diagram of a processor unit.

FIG. 4 shows a processor unit PE which can, in particular, be included in a communication device such as a base station BS or a mobile station MS. It includes a control device STE which essentially comprises a program-controlled microcontroller, and a processing device VE which comprises a processor, in particular a digital signal processor, which can access memory modules SPE both in write or read mode.

The microcontroller controls and monitors all the essential elements and functions of a function unit which includes the processor unit PE. The digital signal processor, a portion of the digital signal processor or a specific processor is responsible for carrying out the speech coding or speech decoding. The selection of a speech codec can also be performed by the microcontroller or the digital signal processor itself.

An input/output interface I/O serves for inputting/outputting useful or control data, for example to an operator's station MMI, which can include a keyboard and/or a display. The individual elements of the processor unit can be interconnected by a digital bus system BUS.

A person skilled in the art can use the description to apply the invention to other CELP coding methods explained in the application, as well.

We claim:

1. A method for error masking in performing a transmission of parameter values, which comprises:
   converting parameter values into a binary representation;
   at a transmitting end, adding first redundant information to at least some of the parameter values by precoding the binary representation of the at least some of the parameter values separately with a respective linear block code, and performing the precoding before transmitting the binary representation of the at least some of the parameter values over a faulty channel; and
   using the first redundant information at a receiving end to estimate the parameter values rather than using the first redundant information for error detection.

2. The method according to claim 1, which comprises:
   at the transmitting end, performing at least a source coding to obtain the parameter values;
   adding second redundant information to the precoded binary representation of the at least some of the parameter values; and
   after the binary representation of the at least some of the parameter values have been transmitted over the faulty channel to a receiving end, using the second redundant information, at the receiving end, for a process selected from the group consisting of error detection and error correction.

3. The method according to claim 2, wherein the second redundant information is added for channel coding.

4. The method according to claim 1, which comprises using the first redundant information at a receiving end as a posteriori information to estimate the parameter values.

5. The method according to claim 1, which comprises performing a soft bit speech decoding method to estimate the parameter values.

6. A transmitting device for transmitting parameter values, comprising a processor unit configured for:
   converting parameter values into a binary representation;
   adding first redundant information to at least some of the parameter values by preceding the binary representation of the at least some of the parameter values separately with a respective linear block code, and performing the precoding before transmitting the binary representation of the at least some of the parameter values over a faulty channel; and
   adding the first redundant information to the at least some of the parameter values in a manner such that at a receiving end, the first redundant information can be used for estimating the parameter values rather than for error detection.

7. A receiving unit, comprising:
   a receiving device configured for receiving parameter values which have been converted into a binary representation at a transmitting end before being transmitted over a faulty channel, first redundant information having been added to at least some of the binary representation of the parameter values by precoding, separately with a respective linear block code, before the binary representation of the parameter values have been transmitted over the faulty channel; and
   a processor unit configured for using the first redundant information to estimate the parameter values rather than for using the first redundant information for error detection.

* * * * *

UNITED STATES PATENT AND TRADEMARK OFFICE
CERTIFICATE OF CORRECTION

PATENT NO. : 6,567,949 B2
DATED : May 20, 2003
INVENTOR(S) : Stefan Heinen and Wen Xu It is certified that error appears in the above-identified patent and that said Letters Patent is hereby corrected as shown below:

<u>Title page,</u>
Item [30], should be inserted following Item [63] and read as follows:

-- [30]  Foreign Application Priority Data
May 29, 1998        (EP)        ......... 981 09 868 --

Signed and Sealed this

Ninth Day of September, 2003

JAMES E. ROGAN
*Director of the United States Patent and Trademark Office*